(12) United States Patent
Loaiza et al.

(10) Patent No.: US 7,600,063 B2
(45) Date of Patent: *Oct. 6, 2009

(54) TECHNIQUES FOR IMPROVED READ-WRITE CONCURRENCY

(75) Inventors: Juan Loaiza, Woodside, CA (US); Neil MacNaughton, Los Gatos, CA (US); Eugene Ho, San Ramon, CA (US); Vipin Gokhale, Fremont, CA (US); Kiran Goyal, Foster City, CA (US); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 11/521,908

(22) Filed: Sep. 15, 2006

(65) Prior Publication Data
US 2008/0071997 A1    Mar. 20, 2008

(51) Int. Cl.
*G06F 12/00*    (2006.01)
(52) U.S. Cl. .................. 710/200; 710/240; 711/150
(58) Field of Classification Search ......... 711/150–152; 710/200; 707/8, 201–202
See application file for complete search history.

(56) References Cited

U.S. PATENT DOCUMENTS

| 5,893,157 | A | 4/1999 | Greenspan et al. |
| 5,895,494 | A | 4/1999 | Scalzi et al. |
| 6,795,901 | B1 | 9/2004 | Florek et al. |
| 7,392,335 | B2 * | 6/2008 | Chan et al. ............... 710/200 |
| 2003/0145146 | A1 | 7/2003 | Posner et al. |
| 2006/0136376 | A1 | 6/2006 | Jain et al. |
| 2007/0192524 | A1 | 8/2007 | Chan et al. |

OTHER PUBLICATIONS

Molesky, Lory D., et al., "Database Locking Protocols for Large-Scale Cache-Coherent Shared Memory Multiprocessors: Design, Implementation and Performance", University of Massachusetts, Department of Computer Science, written Jun. 6, 1995, 24 pages.

Molesky, Lory D., et al., "Efficient Locking for Shared Memory Database Systems", University of Massachusetts, Department of Computer Science, Lederle Graduate Research Center, partially supported by the National Science Foundation under grant IRI-9109210, written Mar. 1994, 28 pages.

* cited by examiner

*Primary Examiner*—Clifford H Knoll
(74) *Attorney, Agent, or Firm*—Hickman Palermo Truong & Becker LLP (57) ABSTRACT

Techniques are provided for performing changes to a resource governed by a locking mechanism. An entity (such as a server instance in a database system cluster) requests permission to modify the resource. In response to the request, the entity receives a first lock on the resource, which grants permission to perform the change to the resource without making the change permanent. After receiving the first lock, the entity performs the change to a copy of the resource that resides in shared memory without making another copy of the resource. After performing the change and until receiving permission to make the change permanent, the entity prevents the change to the resource from becoming permanent. After performing the change, the entity receives a second lock on the resource, which grants the entity permission to make the change permanent. After receiving the second lock, the entity ceases to prevent the change to the resource from becoming permanent.

36 Claims, 4 Drawing Sheets

TECHNIQUES FOR IMPROVED READ-WRITE CONCURRENCY

CROSS-REFERENCE TO RELATED APPLICATIONS

This application is related to U.S. patent application Ser. No. 11/351,675, entitled "ANTICIPATORY CHANGES TO RESOURCES MANAGED BY LOCKS", filed by Chan et al. on Feb. 10, 2006, the entire content of which is hereby incorporated by reference for all purposes as if fully set forth herein.

FIELD OF THE INVENTION

The present invention generally relates to controlling access to resources. The invention relates more specifically to techniques for improved read-write concurrency to shared resources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One mechanism for controlling access to resources uses locks. A lock on a resource is a data structure which indicates that a particular entity has been granted certain rights with respect to the resource. There are many types of locks. Locks of certain types may be shared by many entities, while locks of other types prevent any other locks from being granted on the same resource.

In one example, a table and the records stored therein may be a resource that is accessed by entities, such as, for example, processes executing in one or more computer systems. In this example, ownership of a NULL lock on the table grants a process no permission to access the table in any manner. Ownership of an exclusive lock grants a process permission to do anything with a table, and guarantees that no other process is performing any operation on the table. Due to the various permissions and guarantees associated with the above types of locks, certain lock combinations are not allowed. For example, if a process owns an exclusive lock on a resource, then no other process can be granted any lock other than a NULL lock.

A type of lock that may be held by more than one entity at a time is referred to herein to as a share lock. For example, two processes can concurrently hold read locks on the same resource at the same time, so read locks are one type of share locks. For the purposes of explanation, the following description shall refer to exclusive locks, share locks, and NULL locks.

Before an entity can perform an operation on a resource, the entity is required to obtain a lock that grants the entity the right to perform the desired operation on the resource. To obtain a lock, an entity transmits a request for the lock to a lock manager. A lock manager is a process executing in a computer system that is responsible for granting, queuing, and keeping track of locks on one or more resources. To manage the use of resources in a distributed system, lock managers may be executed on one or more nodes in the distributed system.

According to one past approach for managing locks, a lock manager implements two types of objects: a resource object and a lock. Resource objects are data structures that correspond to actual resources. The lock manager establishes a mapping between actual resources and resource objects. Each resource object is associated with two queues: a granted queue and a convert queue. The granted queue is an unordered list of locks that have been granted. The convert queue is a partially ordered list of locks that have been requested, but not yet granted. Typically, a request for a lock is actually a convert request, where a process holding a lock is requesting that the lock it holds be converted from one type of lock to a different type of lock. The lock manager attaches locks to the grant queues of resource objects to indicate that the entity identified in the lock has been granted a lock of the type indicated in the lock on the resource that corresponds to the resource object to which the lock is attached.

Figure 1:
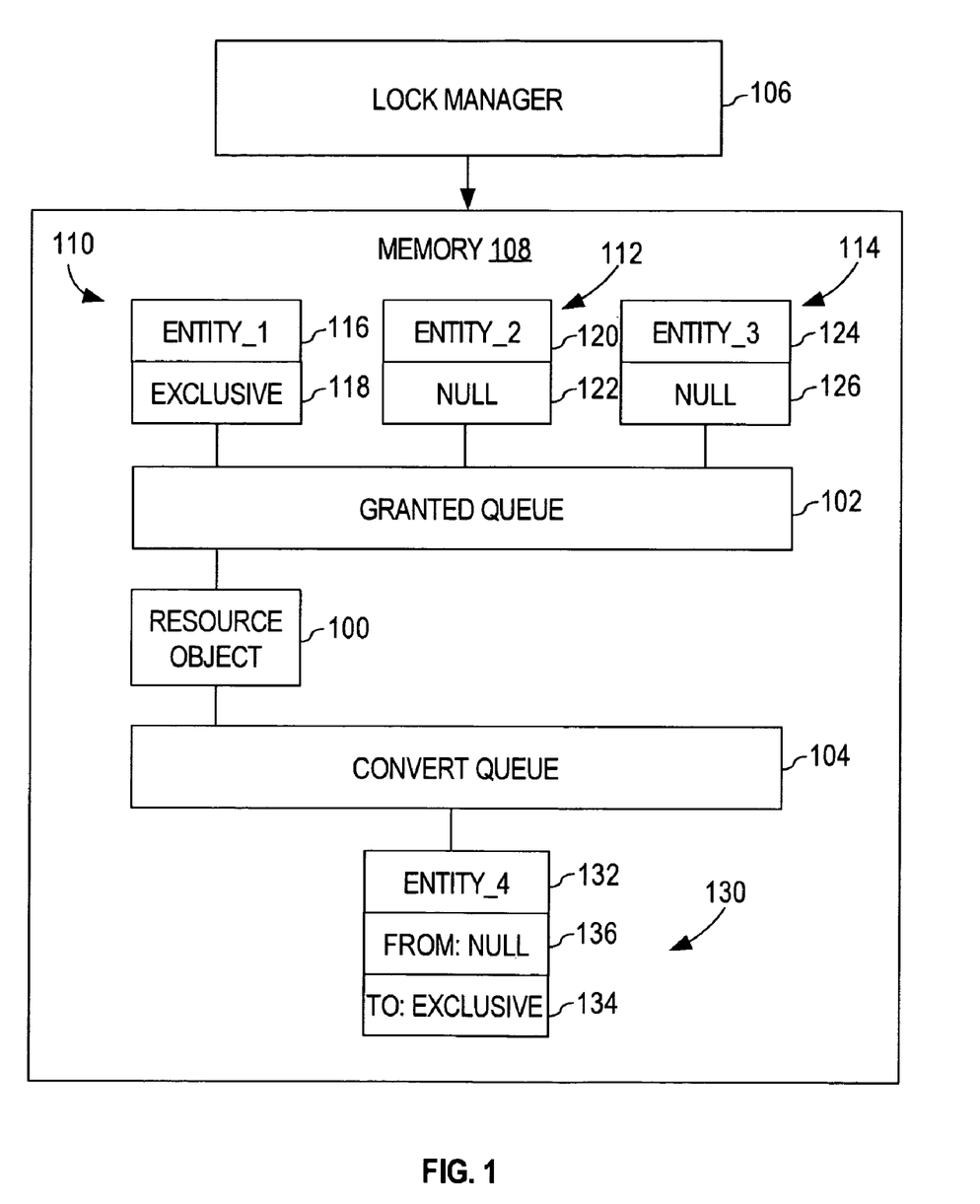
FIG. 1 is a block diagram of a lock manager and a resource object that may be used to manage locks on a resource.

FIG. 1 is a block diagram illustrating a lock manager 106 that is implemented according to this past approach. Lock manager 106 is a process that is configured to manage the locks on resource objects, such as resource object 100, that are stored in a memory 108. Resource object 100 is associated with a granted queue 102 and a convert queue 104. Lock manager 106 has attached three locks 110, 112 and 114 to the granted queue 102, and one convert request 130 to the convert queue 104.

All locks and convert requests have an entity ID portion and a lock type portion. The entities identified by the entity IDs may be any entities that are capable of requesting locks, such as, for example, processes executing in a computer system. In FIG. 1, the entity ID portion 116 of lock 110 indicates that an entity ENTITY_1 owns lock 110, and the lock type portion 118 of lock 110 indicates that lock 110 is an exclusive lock. The entity ID portion 120 of lock 112 indicates that lock 112 is owned by an entity ENTITY_2, and the lock type portion 122 of lock 112 indicates that lock 112 is a NULL lock. The entity ID portion 124 of lock 114 indicates that lock 114 is owned by an entity ENTITY_3, and the lock type portion 126 of lock 114 indicates that lock 114 is a NULL lock. The entity ID portion 132 of convert request 130 indicates that convert request 130 is associated with entity ENTITY_4, and the lock type portion 136 of convert request 130 indicates that ENTITY_4 currently holds a NULL lock on the resource. In addition to a lock type portion 136, convert request 130 also includes a requested lock type portion 134 which indicates that ENTITY_4 is requesting an exclusive lock.

Lock manager 106 has attached locks 110, 112 and 114 to granted queue 102, indicating that ENTITY_1 currently has exclusive ownership of the resource that corresponds to resource object 100. Lock manager 106 has attached convert request 130 to the convert queue 104, indicating that ENTITY_4 has requested but has not yet been granted an exclusive lock on the resource associated with resource object 100.

According to the lock manager implementation illustrated in FIG. 1, information pertaining to any given resource may be stored in the resource object that corresponds to the resource. Further, when the lock manager of FIG. 1 is used to manage a plurality of resources in a distributed system, each resource object associated with a resource is stored in the memory of a single node of the distributed system.

According to the above lock management approach, an entity may initially establish a NULL lock on all resources that the entity will possibly use. Then, when the entity actually requires access to a resource, the entity requests that its NULL lock be converted to a lock that grants to the entity the rights to perform the desired operation. However, this lock convert request may be granted only when there are no conflicting locks that are currently granted on the resource.

For example, to delete a table, a process must obtain an exclusive lock on the resource object that corresponds to the table. To obtain the exclusive lock, the process transmits a message to the lock manager that controls the resource object that corresponds to the table. In the message, the process requests that its current NULL lock be converted to an exclusive lock. If no other process currently holds an exclusive lock on the table, and if no currently granted locks (such as any share locks) would prevent the grant of an exclusive lock, then the current lock held by the requesting process is converted to an exclusive lock. However, if a share lock on the table has already been granted to some process (the "blocking" process), then an exclusive lock cannot be immediately granted. Under these circumstances, the lock convert request is placed on the convert queue of the resource object. When the blocking process is ready to release the share lock it holds on the table, the blocking process may send a lock release request to the lock manager. Alternatively, the lock manager may send a message with a down-convert request to the blocking process requesting that the share lock on the resource be released. After the lock manager receives the lock release request from the blocking process, the lock manager converts the share lock held by the blocking process to a lesser lock that allows the grant of the exclusive lock. The requested exclusive lock is then granted and a message is sent to the requesting process to inform the requesting process that the exclusive lock has been granted.

The above lock management approach, however, has some disadvantages when it is implemented in a distributed system that includes numerous entities capable of requesting resources that are shared throughout the system. One such disadvantage is an impeded read-write concurrency to resources.

For example, the distributed system may be a cluster of database server instances, where each instance executes in its own memory space and where the different instances may execute on the same or different computer systems. In this database server cluster system, each instance in the cluster of database server instances has read-write access to data blocks on a storage medium, such as, for example, shared hard disks or a Storage Area Network (SAN). The data blocks on the storage medium typically store the data of one or more databases that are managed by one or more of the database server instances of the cluster.

In such a database server cluster, it is not uncommon for many database server instances to concurrently hold share locks on the same data block. The set of database server instances that hold share locks on a particular data block are collectively referred to in this example as the "share lock holders". The database server instance that is associated with the lock manager that manages the locks on a particular data block is referred to in this example as the "master" of the data block.

If one of the share lock holders (the "requestor") wants to convert its share lock on a particular data block to an exclusive lock, the requestor has to first send a convert request to the master of that data block in order to upgrade its share lock to an exclusive lock. When this shared-to-exclusive convert request reaches the head of the convert queue at the master of the data block, the master sends down-convert request messages to all share lock holders asking them to down-convert or release (close) the share locks they hold on that data block. The master can grant the exclusive lock on the data block to the requestor only after all share lock holders acknowledge to the master that they have down-converted or released the share locks on the data block that they were holding.

However, between the time the requester sends the shared-to-exclusive convert request and the time that the exclusive lock on the data block is granted, the requestor, and/or any transaction executing at the requestor that involves that data block, has to wait. The requestor cannot start modifying the data block or perform any related subsequent work even though the requestor may already have a current copy of the data block in its shared memory and is certain (by virtue of its share lock on the data block) that no process or transaction executing on any other database server instance in the cluster is allowed to modify the data block on the storage medium. Further, this read-write concurrency problem is exacerbated in a database server cluster with many instances because the number of share lock holders may be quite large and because before granting the exclusive lock on the data block the master must wait for lock release or down-convert acknowledgements from all of the share lock holders.

Although the read-write concurrency disadvantage of the past lock management approach is presented above with respect to data blocks and instances in a database server cluster, it is noted that this disadvantage is not unique to lock management in database server clusters. Rather, this read-write concurrency disadvantage is common to any lock management approach for controlling access to shareable resources in a distributed system.

Based on the foregoing, there is a clear need for techniques for improved read-write concurrency that overcome the disadvantage of the past lock management approach described above.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for reducing the delay between when an entity, such as a process, requests permission to modify a resource, and when the entity is allowed to begin modifying the resource. For the purpose of explanation, examples shall be given in which the resource is a data block, where a copy of the data block is stored in shared memory controlled by the entity that modifies the data block. However, this is merely one example of a resource to which the techniques may be applied. In some embodiments, the techniques described hereafter may be applied to resources that are different types of data and/or database objects including, but not limited to, tables, indexes, views, triggers, stored procedures, records stored in database objects (e.g. in tables, materialized views, and indexes), and user-defined functions and/or packages. Thus, the techniques described hereafter are not limited to any particular type of resource, and for this reason the examples provided hereafter are to be regarded in an illustrative rather than a restrictive sense.

When a process holds a share lock on a data block, a current copy of the data block typically already exists in shared memory of the computer system in which the process is executing. The techniques described hereafter allow a process that desires to modify a data block ("requestor") to perform a change to the shared copy of the data block (a) without making a separate copy of the data block, and (b) without waiting for a strong exclusive lock, from the node at which locks on the resource are managed ("master" of the resource), to make the change to the data block permanent. Consequently, the delay between the time a requestor requests to modify the data block and the time the data block is modified is reduced without incurring the overhead of making a copy of the data block.

Types of Exclusive Locks

The techniques described herein provide for at least two different types of exclusive locks that can be granted on a resource: weak exclusive locks and strong exclusive locks. As used herein, a strong exclusive lock (also referred to in past approaches as just "exclusive lock") is a lock that grants an entity permission to perform any operation on a resource and guarantees that no other entity is performing any operation on the resource. As used herein, a weak exclusive lock refers to a lock that grants an entity permission to perform changes to a copy of the resource but does not grant the entity permission to make the changes permanent. Further, according to the techniques described herein, performing changes on a resource may involve performing one or more operations that modify a resource, such as, for example, write operations of any kind, update operations, append operations, delete operations, and truncate operations.

The techniques described herein are used in conjunction with share locks. As referred to herein, a share lock is a lock that grants an entity permission to access (e.g. read) the contents of a resource, but does not grant the entity permission to modify the resource, does not guarantee that the resource is not being modified by another entity, and does not guarantee that there are no changes to the resource that have not been made permanent by another entity.

Shared-to-Exclusive Lock Upgrades

For the purpose of illustration, assume that a requestor holds a share lock on a data block and desires to modify the data block. The share lock held by the requestor may be a share lock as described above or any other type of share lock that can be granted on the data block. Techniques are provided that allow the requestor to start modifying a copy of the data block that is stored in shared memory at the node at which the requestor is executing (and which copy of the data block the requestor already has) even before the requestor has been granted a strong exclusive lock on the data block.

According to one embodiment, whenever there is a share-to-exclusive lock request for a data block, the master of the data block treats the request differently than other types of convert lock requests. Specifically, upon receiving such a request, the master determines whether the share-to-exclusive lock request can be immediately granted. If the share-to-exclusive request cannot be immediately granted, then rather than simply placing the request in the convert queue, the master determines (1) whether there are only share lock holders (e.g. there are no holders of exclusive locks on the data block) on the grant queue associated with the data block, and (2) whether there are any pending requests for exclusive locks on the convert queue associated with the data block.

If there are only share lock holders on the grant queue, and there are no pending exclusive requests on the convert queue, then the master puts the convert request at the head of the convert queue and sends a message to the requestor, where the message indicates that a weak exclusive lock on the data block is granted to the requestor. The weak exclusive lock grants the requestor permission to make changes to the copy of the data block in shared memory but does not allow the requestor to make these changes permanent. The master also sends out down-convert request messages to all current share lock holders.

Significantly, the master sends the message with the weak exclusive lock to the requestor even though one or more currently-granted locks are incompatible with the permission requested in the share-to-exclusive lock request from the requestor, and therefore prevent the requested permission from being granted to the requestor at present. As reflected in the message, the weak exclusive lock granted on the data block indicates that the requested permission is likely to be granted, but that the requested permission is not yet granted.

When the requestor receives the message with the weak exclusive lock, the requester can immediately start modifying the copy of the data block in shared memory without making another copy of the data block. Changes, which are made to the existing copy of the data block (1) after the weak exclusive lock on the data block is received and (2) before permission to make these changes permanent is received from the master, are prevented from being made permanent. In addition, if the changes are performed to the data block by the requestor as part of a transaction, then the transaction is prevented from committing at least until permission to make the changes permanent is received from the master.

When all share lock holders down-convert their share locks and send the corresponding acknowledgements in messages to the master, the master sends a message to the requestor, where the message indicates that a strong exclusive lock on the data block is granted to the requester. The strong exclusive lock grants the requestor exclusive access to the data block and permission to make any changes to the data block permanent. When the requester receives the message indicating the strong exclusive lock, the requester ceases to prevent the changes made to the data block from becoming permanent. For example, when the requestor receives the message indicating that the strong exclusive lock has been granted to the requestor, the requestor may proceed with making permanent the changes made to the copy of the data block in shared memory.

The example of the techniques provided in this section is presented in a scenario in which the requestor is upgrading from a share lock to an exclusive lock. However, the techniques described herein are applicable in any scenario involving requests to modify resources that are managed using locks. Thus, the techniques described herein are equally applicable in a variety of other scenarios, such as, for example, when the request send by the requestor is for an upgrade to a "protected write" lock. Further, the requestor described in this section may be any type of entity that is capable of requesting and acquiring locks on resources including, but not limited to, a server instance, a client, a daemon, an operating system, and generally any a process or thread that is allocated computational resources and is executing in a computer system.

Providing Unchanged Copies of Resources Protected by Weak Exclusive Locks

According to the techniques described herein, while one entity holds a weak exclusive lock on a resource, an unchanged copy of the resource may be provided to other entities.

For example, assume that a first process acquires a weak exclusive lock on a data block in order to perform changes to the data block. The first process may be, for example, a process executing in a database server instance that is part of a cluster. The first process, executing in the memory space of the database server instance, may be executing a transaction that updates data stored on the data block.

While the first process holds the weak exclusive lock, the requestor may make changes to the copy of the data block that resides in shared memory, without having to make a separate copy of the data block to make the changes. After the first process has performed the changes to the copy of the data block that resides in shared memory, and before the first process has received permission from the master to make these changes permanent, another process may request to read the data block.

For example, a second process running in the same database instance as the first process may send a request to the master to read data stored on the data block. Since the data block is stored in shared memory, the second process should also be able to access the data block, except that for consistency purposes the second process should not be able to see any changes to the data block that have not been made permanent.

Under these conditions, after receiving the request from the second process, a rollback mechanism is invoked to make a new copy of the changed data block in shared memory. The rollback mechanism then rolls back, from the new copy of the changed data block, any changes that were made by the first process and that have not yet been made permanent. The new copy of the data block (minus the rolled back changes) is then accessed by the second process. In this way, the second process receives an unchanged version of the data block even though the first process made changes directly to the copy of the data block that resides in shared memory.

Significantly, the event that triggers the creation of a second copy of the data block is the read request made by the second process, not the weak exclusive lock grant obtained by the first process or the updates made by the first process. Consequently, in situations in which no such read requests occur, the overhead associated with making a second copy of the data block is avoided.

In one embodiment, the mechanisms for making a new copy of the data block and then rolling back any changes that have not yet been made permanent are part of a transaction management system that is part of the database server instance. Typically, such a transaction management system implements various transaction-related techniques such as, for example, techniques for maintaining and utilizing rollback, undo, and/or redo records of changes that are made as part of transactions.

Operational Context of an Example Embodiment

In one embodiment, the techniques described herein are implemented in a distributed system that is a cluster of database server instance nodes, where each instance executes as a node in its own memory space and where the different instances may execute on the same or different computer systems and/or hardware platforms. In general, a server is a combination of integrated software components and an allocation of computational resources, such as memory, CPU time, and/or access to space in a storage medium. By utilizing its allocated resources, a database server performs data management functions, such as, for example, governing and facilitating access to particular databases, and processing requests by clients to access the databases. A database server instance is a database server that has been allocated its own separate computational resources. A cluster of database server instances is a collection of a plurality of database server instances that are communicatively and/or operatively connected and are capable of exchanging data (such as data blocks) and communications with each other.

In one embodiment of the techniques described herein, each instance in the cluster of database server instances has read-write access to the same data blocks on a storage medium, such as, for example, shared hard disks or a Storage Area Network (SAN). The data blocks on the storage medium typically store the data of one or more databases that are managed by one or more of the database server instances in the cluster.

In one embodiment, a requestor that sends a request for permission to modify a data block is a database server instance. The database server instance is, in turn, a node in a cluster of database server instances. A master that manages the locks on a particular data block is also a node in the cluster of database server instances. At the master node, the locks on one or more data blocks may be managed by one or more lock managers that may execute in the memory space of the master node or in a separate memory space that is provided by the operating system on top of which the master node is executing.

Typically, if the requester node does not already have a copy of the current version of the data block in memory, the requestor node obtains a copy (either from disk, or by direct transfer from another node). The requestor node stores the copy of the current version of the data block in its shared memory. One or more processes executing in the memory space of the requestor node (such as, for example, one or more database sessions) have access to the copy of the data block in the shared memory.

In this embodiment, the requestor node is responsible for retrieving and maintaining current the copy of the data block into shared memory so that the processes executing at the requestor node can access and modify the data stored in the data block. Since other nodes in the cluster of database server instances may also store and maintain copies of the same data block in their shared memory for use by their own processes, the requestor node needs to make sure it has permission to make permanent any changes to the data block that are requested by the processes executing at the requestor node.

In this operational context, the techniques described herein provide for reducing the delay between the time the requestor node requests to modify the data block and the time the requestor node begins to the make changes to the copy of the data block in its shared memory. When the requestor node is notified that a process executing on the requestor node needs to make changes to the data block, the requestor node sends a request to the master node for permission to perform the changes to the resource. In response to the request, the requestor node receives a weak exclusive lock on the resource. After receiving the weak exclusive lock on the resource, the requestor node performs the changes on behalf of its process but does not make these changes permanent since the received weak exclusive lock does not grant permission to do so.

Thereafter, the requestor node receives a strong exclusive lock on the data block and, in response, ceases to prevent the changes to the data block from becoming permanent (e.g. ceases to prevent the transaction that made the changes from committing). Even though the requestor node has received a strong exclusive lock, if the changes were made as part of a transaction, then the changes cannot actually be made permanent until the transaction that made the changes is ready to commit.

Typically, the transaction on whose behalf the requestor node makes the changes runs a lot longer than it takes to receive the strong exclusive lock on the data block, and for this reason the requestor node typically receives permission to make the changes permanent long before it can actually make the changes permanent.

In one embodiment, the processes at the requestor node that have access to the copy of the data block in shared memory may obtain transaction-level locks from the requestor node on any data records that include the data stored in the copy of the data block. Such transaction-level locks, however, are separate from any locks on the data block that are granted to the requestor node by the master node. The locks received from and managed by the master node ensure that only a single database server instance has exclusive access to modify the data block at any given time. The transaction-level locks on data records that include the data stored in the copy of the data block in shared memory at the requestor node ensure that any changes made to such data records would be consistent within the requestor node.

Transactionally-Managed Resources

Within some systems, such as database systems, a series of operations may be performed as a transaction. The changes made to resources by a transaction must be committed as an atomic unit. Therefore, as long as a transaction has any changes to resources that are prevented from becoming permanent, none of the changes made by the transaction may be committed.

In some embodiments, the techniques described herein are performed on transactionally-managed resources. For example, transactionally-managed data blocks are data blocks that are managed as part of transactions, where changes made to the data blocks may be seen by other transactions only when the transactions modifying the data blocks are committed.

According to the techniques described herein, when a requestor receives a weak exclusive lock on a resource from the master of the resource, the requestor may immediately begin to perform changes on the resource but cannot make the changes to the resource permanent. Thus, if the resource is being modified as part of a transaction, the transaction is also prevented from being committed (even though all operations of the transaction may have otherwise been successfully completed). The transaction is allowed to commit after the requestor receives a strong exclusive lock on the resource from the master of the resource, where the strong exclusive lock grants permission to make the changes to the resource permanent.

Once all of the changes made to the resource have been permitted to become permanent, the transaction may commit. When the transaction commits, a commit time (usually in the form of a system commit number) is assigned to the transaction. The commit time is added, as needed, to any redo records that were generated for the transaction. The redo records are then linked into a checkpoint queue to be flushed to disk to make the changes to the resource permanent. After the changes are made permanent, the changes can be accessed by other transactions or database server instances.

Operations at the Lock Requestor

Figure 2:
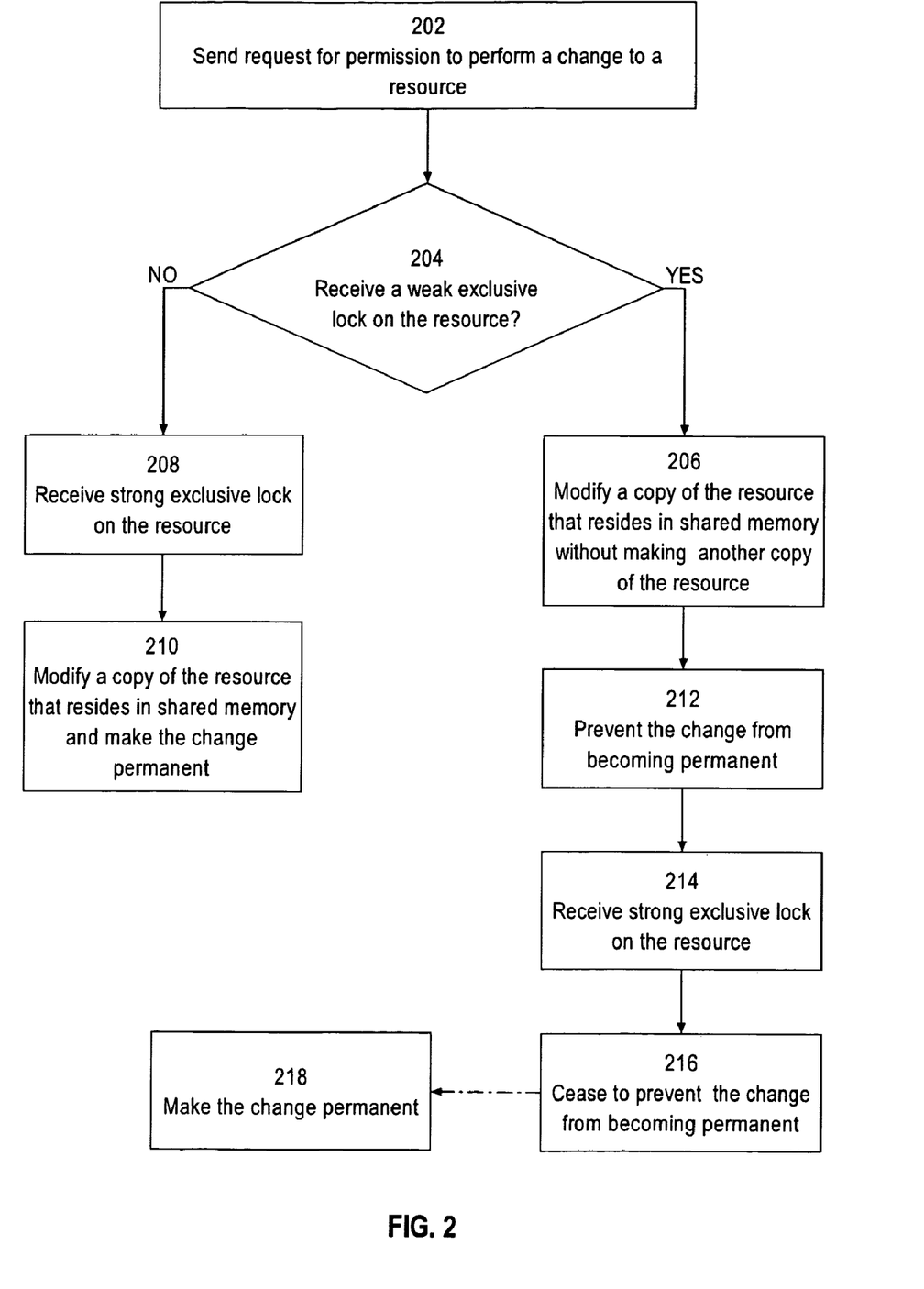
FIG. 2 is a flow diagram illustrating a method performed by an entity that desires to modify a resource, according to one embodiment.

FIG. 2 is a flow diagram that illustrates a method performed by an entity that desires to modify a resource according to one embodiment of the techniques described herein. In step 202, a requestor that wants to modify a resource sends a request for permission to perform a change to the resource to a master of the resource, where the master of the resource is associated with a the lock manager that manages locks on the resource.

In step 204, the requester determines whether it received a weak exclusive lock on the resource in response to the request. If the lock manager at the master has determined that no currently granted locks on the resource prevent the lock manager from granting the requestor permission to perform the change to the resource (for example, only NULL locks but no shared or exclusive locks are currently granted on the resource), then the master would cause the requestor to receive a strong exclusive lock on the resource. Thus, if in step 204 the requestor determines that it has not received a weak exclusive lock in response to the request, control passes from step 204 to step 208. In step 208, the requester eventually receives the strong exclusive lock on the resource. After the requestor receives the strong exclusive lock, in step 210 the requester can perform the changes to a copy of the resource that resides in shared memory and can make the changes permanent.

If in step 204 the requestor determines that it has received a weak exclusive lock on the resource in response to the request, control passes from step 204 to step 206. In step 206, the requestor performs the changes to a copy of the resource that resides in shared memory without making another copy of the resource.

In step 212, after making the change to the copy of the resource in shared memory and before receiving permission to make the change to the resource permanent, the requestor prevents the change from becoming permanent and proceeds with performing other operations. The fact that the requester can go on to do other work before receiving permission to make the change to the resource permanent can lead to significant performance benefits. The longer the lag between requesting permission to modify the resource and receiving permission to make changes to the resource permanent, the greater the benefit of being able to proceed with making the change to the copy of the resource without waiting for the permission to make the change permanent.

If during the time that the change to resource is prevented from becoming permanent a second process at the requestor requests an unchanged version of the resource, the requester may generate a new copy of the resource that includes the changes to the resource that are prevented from becoming permanent. Then, the requestor may rollback the changes from the new copy of the resource to obtain the unchanged version of the resource, and may provide this new copy to the second process. In this way, the requestor is capable of providing an unchanged version of the resource to other processes during the time that changes made to the copy of the resource in shared memory are prevented from becoming permanent.

In step 214, the requestor eventually receives a strong exclusive lock on the resource from the master. The strong exclusive lock grants the requestor permission to make permanent the change that was made to the copy of the resource in shared memory. In response to receiving the strong exclusive lock, in step 216 the requestor ceases to prevent the change from becoming permanent. If the change was being made as part of a transaction that was executing on the requestor, at this point the transaction is also ceased from being prevented to commit.

Thereafter, in step 218 the requestor eventually makes permanent the change performed to the copy of the resource in shard memory. The actual process of making a change permanent may vary from system to system. For example, in some systems, a change may be made permanent by flushing to disk "redo records" that identify the change to the resource. Some systems may make a change permanent by flushing to disk the changed copy of the resource. Other systems may have other mechanisms by which changes are made permanent. Thus, the techniques described herein are not restricted to any particular mechanism of making a change permanent.

Operations at the Master of a Resource

Figure 3:
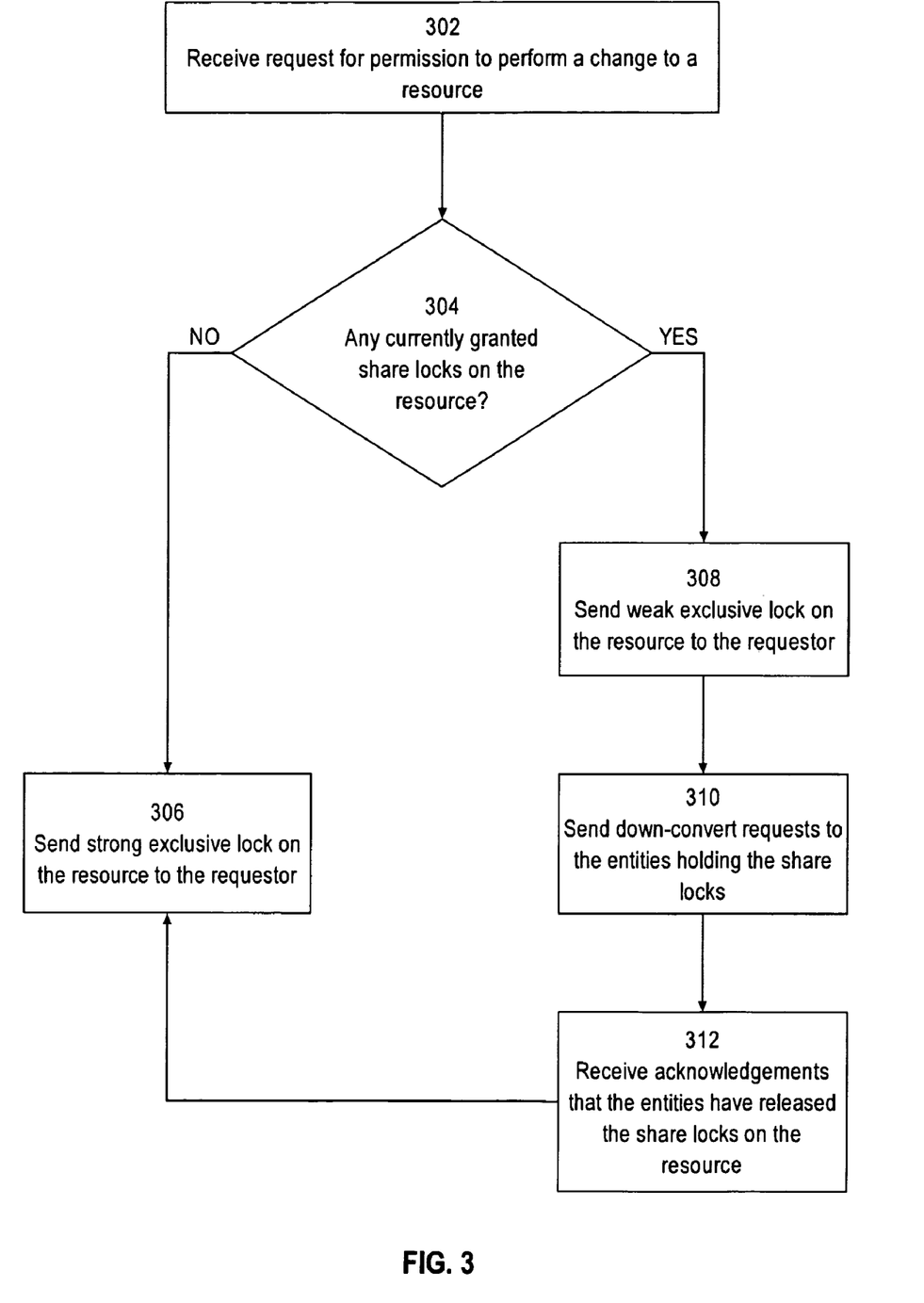
FIG. 3 is a flow diagram illustrating a method performed at an entity that manages locks on a resource, according to one embodiment.

FIG. 3 is a flow diagram illustrating a method performed at an entity that manages locks on a resource according to one embodiment of the techniques described herein. In this embodiment, the entity may be a master node that executes a lock manager that manages locks for one or more resources.

In step 302, the master receives, from a requestor, a request for permission to perform a change to a resource. The master (or a component thereof, such as the lock manager) then determines whether there are any currently granted locks on the resource that prevent the master from granting the requestor permission to make the change permanent. For example, the master may determine whether there are any already granted locks that allow an entity other than the requestor to modify the resource. If such locks are currently granted to the other entity, the master (and/or the lock manager) may place the received request in a pending request queue for later processing. For example, in an embodiment that uses resource objects to track locks on a resource, the lock manager at the master may inspect the granted queue of the resource object to determine whether any of the locks on the granted queue are locks that grant permission to modify the resource. Similarly, the lock manager may inspect the convert queue of the resource object to determine whether any of the convert requests on the convert queue are requests for permission to modify the resource. If any locks granting permission to modify the resource are found in the granted queue and/or any request for permission to modify the resource are found in the convert queue, the lock manager places the request received from the requestor on the convert queue and subsequently processes it in turn.

If in step 302 the master determines that there are no currently granted locks on the resource that prevent the master from granting the requestor permission to make the change permanent (for example, no entity has been granted an exclusive lock on the resource), then control passes to step 304. In step 304, the master (or a component thereof, such as the lock manager) determines whether there are any other currently granted locks that prevent the master from granting the requestor permission to perform the change to the resource.

For example, in step 304 the master may determine whether there are any share locks that are currently granted to entities other than the requester.

If in step 304 the master determines that there are no share locks on the resource that are currently granted on entities other than the requestor, then in step 306 the master causes the requestor to receive a message which indicates that a strong exclusive lock on the resource is granted to the requestor. The strong exclusive lock indicates to the requestor that the requestor has exclusive access to the resource and that the requester (or any process or transaction executing thereon) is permitted to perform the change to the resource and to make the change permanent.

If in step 304 the master determines that there are one or more share locks on the resource that are currently granted to entities other than the requester, then in step 308 the master causes the requestor to receive a message which indicates that a weak exclusive lock on the resource is granted to the requestor. The weak exclusive lock indicates to the requestor that the requestor (or any process or transaction executing thereon) is permitted to perform the change on a copy of the resource but is not permitted to make the change permanent.

Thereafter, in step 310 the master (or a component thereof, such as the lock manager) sends down-convert requests to the entities that are currently holding share locks on the resource. The down-convert requests indicate to these entities that the entities must either release their share locks on the resource or down-convert their share locks to locks (e.g. NULL locks) that are compatible with a strong exclusive lock on the resource.

Eventually, in step 312 the master receives acknowledgements from all the entities, which acknowledgements indicate to the master that the entities have either released or down-converted their share locks on the resource. After receiving these acknowledgements the master proceeds with performing step 306, in which step the master causes the requestor to receive a message which indicates that a strong exclusive lock on the resource is granted to the requester. The strong exclusive lock indicates to the requestor that the requestor has exclusive access to the resource and that the requester (or any process or transaction executing thereon) is permitted to perform the change to the resource and to make the change permanent.

Lock Requests by a Requestor That Does Not Currently Hold a Share Clock

In the examples given above, the request for permission to perform a change to a resource comes from a requestor that already holds a share lock on the resource. Because the requestor already holds a share lock, the requestor typically already has a copy of the current version of the resource. However, the techniques described herein may also be applied in situations where a requestor that does not currently hold a share lock on a resource sends a request for permission to perform a change to the resource.

According to one embodiment, when the master of a resource receives a request for permission to perform a change to the resource from a requestor that does not currently hold a share lock on the resource, one or more other entities may have already been granted share locks on the resource.

In this situation, in response to the request the master causes the requestor to receive a weak exclusive lock on the resource. In addition, the master may also cause the requestor to receive a copy with the current version of the resource. For example, the master may send the current copy of the resource to the requestor if the master has it, or the master may direct another entity that has the current copy of the resource to send it to the requestor. Alternatively, after receiving the weak exclusive lock on the resource, the requestor may retrieve a copy of the current version of the resource on its own. For example, if the resource is a data block, and if the requester is a database server instance executing in a cluster of database server instance that has access to the storage medium where the data block is stored, in response to receiving the weak exclusive lock on the data block the requester may retrieve the current copy of the data block from the storage medium.

After the requestor receives the weak exclusive lock on the resource and after the requestor has obtained the current copy of the resource, the requestor may perform the change to the copy of the resource but is not permitted to make the change permanent. In the meantime, the master sends down-convert requests to the entities holding the share locks on the resource asking the entities to release or down-convert their share locks. When the master receives acknowledgements from these entities that the share locks they hold have been released or down-converted, the master causes the requestor to receive a strong exclusive lock on the resource. The strong exclusive lock indicates to the requestor that the requester has exclusive access to the resource and that the requestor (or any process or transaction executing thereon) is permitted to make the change to the resource permanent. After the requestor receives the strong exclusive lock on the resource, the requestor can make the change to the resource permanent.

Hardware Overview

Figure 4:
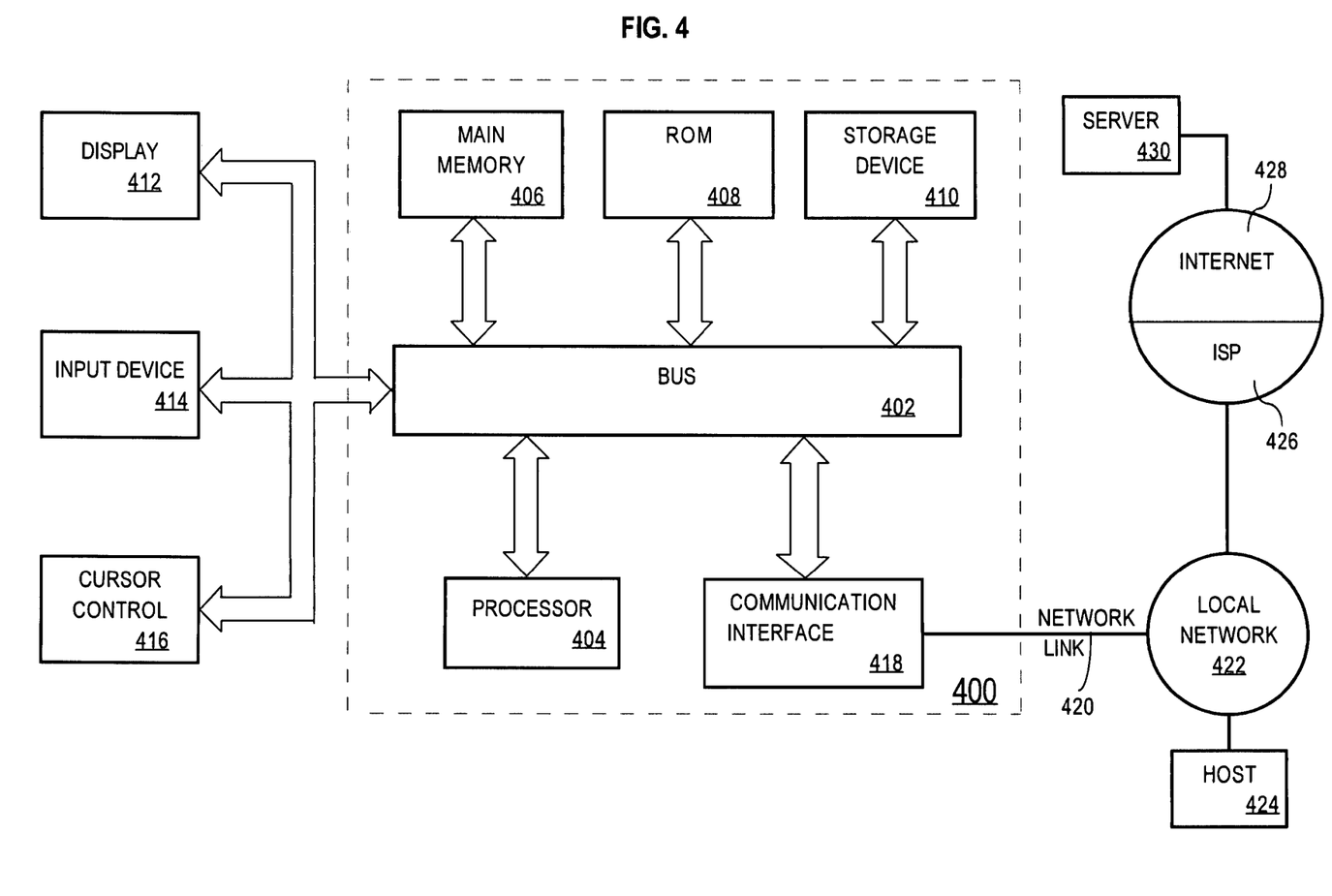
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
   at a requestor node, sending a request for permission to perform a change to a resource;
   in response to the request, receiving a first lock on the resource, wherein the first lock grants permission to perform the change to the resource without making the change permanent;
   after receiving the first lock on the resource, performing the change to a copy of the resource without making another copy of the resource;
   wherein the change is performed to the copy of the resource while the copy resides in shared memory, and wherein the shared memory is accessible by multiple processes that are executing on the requestor node;
   after performing the change and before receiving permission to make the change permanent, preventing the change from becoming permanent;
   after performing the change, receiving a second lock on the resource, wherein the second lock grants permission to make the change permanent; and
   after receiving the second lock on the resource, ceasing to prevent the change from becoming permanent;
   wherein the steps of the method are performed by one or more computing devices.

2. The method of claim 1, wherein the change is performed as part of a transaction, and the step of preventing the change from becoming permanent includes preventing the transaction from committing.

3. The method of claim 1, wherein:
   the resource is a data block in a storage medium;
   the first lock is associated with a first type of a plurality of exclusive lock types, wherein the first type is a weak exclusive lock type; and
   the second lock is associated with a second type of the plurality of exclusive lock types, wherein the second type is a strong exclusive lock type.

4. The method of claim 1 wherein:
   the step of sending the request for permission to perform the change is performed on behalf of a first process; and
   the method further comprises the steps of:
      after performing the change and while preventing the change from becoming permanent, receiving a request for the resource from a second process;
      generating an unchanged copy of the resource based on the copy that resides in the shared memory, wherein the step of generating the unchanged copy includes rolling back the change made to the copy that resides in the shared memory; and
      providing the unchanged copy of the resource to the second process.

5. The method of claim 1, wherein the resource is a data block in a storage medium, wherein the steps of the method are performed by a requestor node that is part of a cluster of nodes that have access to the data block on the storage medium, wherein the cluster of nodes includes a master node that manages locks on the data block, and wherein:
   the step of sending the request for permission includes the requestor node sending the request to the master node;
   the step of receiving the first lock includes receiving a weak exclusive lock on the data block from the master node; and
   the step of receiving the second lock includes receiving a strong exclusive lock on the data block from the master node.

6. The method of claim 5, wherein:
   at the time the requestor node sends the request, one or more other nodes in the cluster hold share locks on the data block; and
   the master node sends the strong exclusive lock to the requestor node only after the master node receives acknowledgements that the one or more other nodes have released the share locks on the data block.

7. The method of claim 6, wherein:
   the master node receives acknowledgements that the one or more other nodes have released the share locks on the data block in response to sending, to the one or more other nodes, down-convert requests to release the share locks on the data block.

8. The method of claim 5, wherein:
   at the time the requestor node sends the request, the requestor node holds a share lock on the data block, and the request for permission to perform the change includes a request to convert the share lock to the strong exclusive lock.

9. The method of claim 5, wherein:
   at the time the requestor node sends the request, the requestor node does not hold any locks on the data block, and the request for permission to perform the change includes a request for the strong exclusive lock on the data block.

10. A computer-readable storage medium storing one or more sequences of instructions which, when executed by one or more processors, cause the one or more processors to perform the method recited in claim 1.

11. A computer-readable storage medium storing one or more sequences of instructions which, when executed by one or more processors, cause the one or more processors to perform the method recited in claim 2.

12. A computer-readable storage medium storing one or more sequences of instructions which, when executed by one or more processors, cause the one or more processors to perform the method recited in claim 3.

13. A computer-readable storage medium storing one or more sequences of instructions which, when executed by one or more processors, cause the one or more processors to perform the method recited in claim 4.

14. A computer-readable storage medium storing one or more sequences of instructions which, when executed by one or more processors, cause the one or more processors to perform the method recited in claim 5.

15. A computer-readable storage medium storing one or more sequences of instructions which, when executed by one or more processors, cause the one or more processors to perform the method recited in claim 6.

16. A computer-readable storage medium storing one or more sequences of instructions which, when executed by one or more processors, cause the one or more processors to perform the method recited in claim 7.

17. A computer-readable storage medium storing one or more sequences of instructions which, when executed by one or more processors, cause the one or more processors to perform the method recited in claim 8.

18. A computer-readable storage medium storing one or more sequences of instructions which, when executed by one or more processors, cause the one or more processors to perform the method recited in claim 8.

19. A method comprising the steps of:
  at a master node that manages locks on a resource, receiving a request for permission to perform a change to the resource from a requester node;
  while one or more currently granted locks prevent the master node from granting permission to cause the change to be made permanent, the master node causing the requester node to receive a first lock on the resource, wherein the first lock grants the requester node permission to perform the change to a copy of the resource without making another copy of the resource within the requester node, wherein the first lock does not grant the requester node permission to make the change permanent;
  wherein the change is performed to the copy of the resource while the copy resides in shared memory of the requester node, and wherein the shared memory is accessible by multiple processes that are executing on the requester node; and
  when no currently granted locks prevent the master node from granting permission to cause the change to be made permanent, the master node causing the requester node to receive a second lock on the resource, wherein the second lock grants the requester node permission to make the change permanent;
  wherein the steps of the method are performed by one or more computing devices.

20. The method of claim 19, wherein the change is performed as part of a transaction that is processed at the requester node, and wherein the first lock on the resource prevents the transaction from committing.

21. The method of claim 19, wherein:
  the first lock is associated with a first type of a plurality of exclusive lock types, wherein the first type is a weak exclusive lock type; and
  the second lock is associated with a second type of the plurality of exclusive lock types, wherein the second type is a strong exclusive lock type.

22. The method of claim 19, wherein:
  the method further comprises the step of the master node determining, upon receiving the request, that the requester node holds a share lock on the resource; and
  the step of the master node causing the requester node to receive the first lock includes sending a message to the requester node, wherein the message indicates that the share lock is converted to a weak exclusive lock.

23. The method of claim 19, wherein:
  the resource is a data block in a storage medium;
  the first lock is a weak exclusive lock on the data block;
  the second lock is a strong exclusive lock on the data block; and
  the master node and the requester node are part of a cluster of nodes that have access to the data block on the storage medium.

24. The method of claim 23, wherein:
  at the time the master node receives the request, one or more other nodes in the cluster hold share locks on the data block;
  the method further comprises the step of the master node receiving acknowledgements that the one or more other nodes have released the share locks on the data block; and
  the step of the master node causing the requester node to receive the strong exclusive lock is performed in response to receiving the acknowledgements.

25. The method of claim 24, wherein:
  the method further comprises the step of the master node sending, to the one or more other nodes in the cluster, down-convert requests to release the share locks on the data block; and
  the step of the master node receiving the acknowledgements is performed in response to sending the down-convert requests to the one or more other nodes.

26. The method of claim 23, wherein:
  at the time the master node receives the request, the requester node holds a share lock on the data block, and the request for permission to perform the change includes a request to convert the share lock to the strong exclusive lock.

27. The method of claim 23, wherein:
  at the time the master node receives the request, the requester node does not hold any locks on the data block, and the request for permission to perform the change includes a request for the strong exclusive lock on the data block.

28. A computer-readable storage medium storing one or more sequences of instructions which, when executed by one or more processors, cause the one or more processors to perform the method recited in claim 19.

29. A computer-readable storage medium storing one or more sequences of instructions which, when executed by one or more processors, cause the one or more processors to perform the method recited in claim 20.

30. A computer-readable storage medium storing one or more sequences of instructions which, when executed by one or more processors, cause the one or more processors to perform the method recited in claim 21.

31. A computer-readable storage medium storing one or more sequences of instructions which, when executed by one or more processors, cause the one or more processors to perform the method recited in claim 22.

32. A computer-readable storage medium storing one or more sequences of instructions which, when executed by one or more processors, cause the one or more processors to perform the method recited in claim 23.

33. A computer-readable storage medium storing one or more sequences of instructions which, when executed by one or more processors, cause the one or more processors to perform the method recited in claim 24.

34. A computer-readable storage medium storing one or more sequences of instructions which, when executed by one or more processors, cause the one or more processors to perform the method recited in claim 25.

35. A computer-readable storage medium storing one or more sequences of instructions which, when executed by one or more processors, cause the one or more processors to perform the method recited in claim 26.

36. A computer-readable storage medium storing one or more sequences of instructions which, when executed by one or more processors, cause the one or more processors to perform the method recited in claim 27.

* * * * *

UNITED STATES PATENT AND TRADEMARK OFFICE
CERTIFICATE OF CORRECTION

PATENT NO.        : 7,600,063 B2
APPLICATION NO.   : 11/521908
DATED             : October 6, 2009
INVENTOR(S)       : Juan Loaiza et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 397 days.

In column 4, line 3, delete "requester" and insert -- requestor --, therefor.

In column 6, line 35, delete "requester" and insert -- requestor --, therefor.

In column 6, line 50, delete "requester." and insert -- requestor. --, therefor.

In column 6, line 53, delete "requester" and insert -- requestor --, therefor.

In column 6, line 54, delete "requester" and insert -- requestor --, therefor.

In column 8, line 41, delete "requester" and insert -- requestor --, therefor.

In column 10, line 20, after "with" delete "a".

In column 10, line 21, delete "requester" and insert -- requestor --, therefor.

In column 10, line 32, delete "requester" and insert -- requestor --, therefor.

In column 10, line 35, delete "requester" and insert -- requestor --, therefor.

In column 10, line 49, delete "requester" and insert -- requestor --, therefor.

In column 10, line 60, delete "requester" and insert -- requestor --, therefor.

In column 11, line 57, delete "requester" and insert -- requestor --, therefor.

In column 11, line 61, delete "requester" and insert -- requestor --, therefor.

Signed and Sealed this

Third Day of August, 2010

David J. Kappos
*Director of the United States Patent and Trademark Office*

In column 12, line 3, delete "requester." and insert -- requestor. --, therefor.

In column 12, line 11, delete "requester" and insert -- requestor --, therefor.

In column 12, line 16, delete "requester," and insert -- requestor, --, therefor.

In column 12, line 38, delete "requester." and insert -- requestor. --, therefor.

In column 12, line 40, delete "requester" and insert -- requestor --, therefor.

In column 13, line 6, delete "requester" and insert -- requestor --, therefor.

In column 13, line 10, delete "requester" and insert -- requestor --, therefor.

In column 13, line 23, delete "requester" and insert -- requestor --, therefor.

In column 17, line 32, in claim 18, delete "claim 8." and insert -- claim 9. --, therefor.

In column 17, line 36, in claim 19, delete "requester" and insert -- requestor --, therefor.

In column 17, line 44, in claim 19, delete "requester" and insert -- requestor --, therefor.